(12) United States Patent
Mukherjee

(10) Patent No.: US 10,635,743 B2
(45) Date of Patent: Apr. 28, 2020

(54) AUTOMATIC EXTRACTION OF DOCUMENT PAGE NUMBERS FROM PDF

(71) Applicant: Microsoft Technology Licensing, LLC, Redmond, WA (US)

(72) Inventor: Kaustav Mukherjee, Kolkatta (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/918,641

(22) Filed: Mar. 12, 2018

(65) Prior Publication Data
US 2019/0278833 A1   Sep. 12, 2019

(51) Int. Cl.
| | | |
|---|---|---|
| *G06F 17/21* | (2006.01) | |
| *G06F 17/22* | (2006.01) | |
| *G06K 9/00* | (2006.01) | |
| G06F 3/0483 | (2013.01) | |

(52) U.S. Cl.
CPC ............ *G06F 17/217* (2013.01); *G06F 17/22* (2013.01); *G06K 9/00469* (2013.01); *G06F 3/0483* (2013.01)

(58) Field of Classification Search
CPC .......... G06K 9/00463; G06K 9/00469; G06K 9/00442; G06K 9/2054; G06F 17/217; G06F 17/22; G06F 3/483
See application file for complete search history.

(56) References Cited

U.S. PATENT DOCUMENTS

| | | | | |
|---|---|---|---|---|
| 6,043,823 | A * | 3/2000 | Kodaira ............. | G06K 9/00469 345/619 |
| 7,210,102 | B1 * | 4/2007 | Gordon ............. | G06K 9/00442 715/253 |
| 2002/0118379 | A1 * | 8/2002 | Chakraborty ....... | G06F 17/2241 358/1.9 |
| 2004/0119998 | A1 * | 6/2004 | Xiong ................ | H04N 1/00013 358/1.13 |
| 2007/0198912 | A1 * | 8/2007 | Meunier ............. | G06F 17/2745 715/209 |
| 2008/0114757 | A1 * | 5/2008 | Dejean .................. | G06F 16/258 |

(Continued)

OTHER PUBLICATIONS

Parikh, et al., "Table of Content Detection using Machine Learning: Proposed System", In International Journal of Artificial Intelligence & Applications, vol. 4, No. 3, May 2013, pp. 13-21.

*Primary Examiner* — Wilson W Tsui
(74) *Attorney, Agent, or Firm* — Arent Fox LLP

(57) ABSTRACT

Examples described herein generally relate to a computer device including a memory, and at least one processor configured to automatically extract page numbers from a portable document format (PDF) file. The computer device may determine a vertical coordinate of each run object in the PDF file. The computer device may identify, among all pages in the PDF file, a common vertical coordinate location within a threshold distance of a top or a bottom of a plurality of the pages. The computer device may determine that a run object at the vertical coordinate location of each page of the plurality of pages follows a numbering pattern. The computer device may convert the run object at the vertical coordinate location of each page into a page number for the respective page. The computer device may display at least one respective page and the page number of the at least one respective page.

18 Claims, 5 Drawing Sheets

(56) References Cited

U.S. PATENT DOCUMENTS

| | | | | |
|---|---|---|---|---|
| 2010/0082937 | A1* | 4/2010 | Sasaki | G06F 17/2235 |
| | | | | 711/206 |
| 2011/0064304 | A1* | 3/2011 | Xiao | G06K 9/2054 |
| | | | | 382/165 |
| 2012/0197908 | A1* | 8/2012 | Unno | G06F 17/2745 |
| | | | | 707/749 |
| 2013/0343658 | A1* | 12/2013 | Dejean | G06K 9/00463 |
| | | | | 382/203 |
| 2014/0036320 | A1* | 2/2014 | Tanaka | H04N 1/40062 |
| | | | | 358/465 |
| 2017/0109610 | A1* | 4/2017 | Macciola | G06K 9/00449 |

* cited by examiner

AUTOMATIC EXTRACTION OF DOCUMENT PAGE NUMBERS FROM PDF

BACKGROUND

The present disclosure relates to display of digital documents on computer devices, and more particularly to display of page numbers.

Digital documents may be data files that represent a document conventionally printed on paper. For example, a common digital document format is the portable document format (PDF). The PDF format includes two techniques for representing page numbers of the document: a mandatory sequential numerical page number and an optional page label defined by a tree structure.

Many real-world documents (e.g., books, newspapers, legal documents, and technical specifications) use numbering systems more complex than a sequential numbers. As a simple example, a book may include an unnumbered inner cover or title page followed by sequential page numbers. As another example, a document may include a table of contents numbered with roman numerals and content pages sequentially numbered. When such documents are represented in a digital document such as a PDF, the PDF sequential numbering (which begins from "1" at the first page) may not align with the numbering system included in the pages of the document (which, for example, may include Roman numerals for the first 8 pages, so what is actually "i" will show up as page 1, and what is actually 1 will show up as page 9). A conventional PDF viewer application may display the PDF sequential number for a displayed page, which may confuse a user and make navigation within the document difficult.

Although the PDF page label system provides an alternative numbering system that may be used to represent many document page numbers, PDF page labels are conventionally specified by a document author. Many document authors, however, specify no page labels or specify page labels that include the same issues as sequential page numbers. Additionally, if a PDF document is manipulated, embedded page labels may be automatically deleted or may become incorrect.

Thus, there is a need in the art for improvements in display of page numbers for digital documents.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

In an example, the disclosure provides a method executed by a computer processor, of automatically extracting page numbers from a portable document format (PDF) file. The method may include determining a vertical coordinate of each run object in the PDF file. The method may include identifying, among all pages in the PDF file, a common vertical coordinate location within a threshold distance of a top or a bottom of a plurality of the pages. The method may include determining that a run object at the vertical coordinate location of each page of the plurality of pages follows a numbering pattern. The method may include converting the run object at the vertical coordinate location of each page into a page number for the respective page. The method may include displaying at least one respective page and the page number of the at least one respective page to a user.

In another example, the disclosure provides a computer device for automatically extracting page numbers from a PDF file. The computer device may include a memory and a processor communicatively coupled to the memory. The processor may be configured to determine a vertical coordinate of each run object in the PDF file. The processor may be configured to identify, among all pages in the PDF file, a common vertical coordinate location within a threshold distance of a top or a bottom of a plurality of the pages. The processor may be configured to determine that a run object at the vertical coordinate location of each page of the plurality of pages follows a numbering pattern. The processor may be configured to convert the run object at the vertical coordinate location of each page into a page number for the respective page. The processor may be configured to display at least one respective page and the page number of the at least one respective page to a user.

In another example, the disclosure provides a computer-readable medium, storing code executable by one or more processors for automatically extracting page numbers from a PDF file. The code may include code for determining a vertical coordinate of each run object in the PDF file. The code may include code for concatenating content of two or more run objects in response to determining that the vertical coordinate of each of the two or more run objects is within a first threshold distance. The code may include code for identifying, among all pages in the PDF file, a common vertical coordinate location within a threshold distance of a top or a bottom of a plurality of the pages. The code may include code for removing a common substring from run objects at the common vertical coordinate on consecutive pages. The code may include code for determining that the run object at the vertical coordinate location of each page of the plurality of pages follows a numbering pattern. The code may include code for converting the run object at the vertical coordinate location of each page into a page number for the respective page. The code may include code for displaying at least one respective page and the page number of the at least one respective page to a user.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

The present disclosure provides systems and methods for display of page numbers of a digital document on a computer device. The methods disclosed herein may allow a document viewer application, which may be part of an operating system, browser plugin, or an independent application, to automatically extract and display correct page numbers for a digital document such as a PDF document. The document viewer application may extract the page numbers from the content of the pages in the digital document by analyzing text on the pages of the digital document to isolate page numbers. For PDF documents, analyzing text is made difficult by a general lack of defined structure to the text. Text is represented simply as run objects. As used herein, a "run object" refers to a string of characters starting at a location with various font properties. The run objects within a PDF document may not be in any particular order. Since there is no concept of line or word, a document viewer application cannot determine a page number by simply analyzing the text of the first word or the first line.

Generally described, the document viewer application uses heuristics to identify run objects that are likely candidates for page numbers. The document viewer application may use an object mapping to organize run objects by vertical coordinates across multiple pages based on the assumption that page numbers (or at least subsets of the page numbers) are likely to occur at the same vertical coordinates on each page. The document viewer application may narrow the number of run objects to consider by focusing on run objects within a threshold distance of the top or the bottom of the page. Candidate run objects occurring at the same vertical coordinate may be evaluated by comparing the run objects to known patterns of page numbers to find an increasing sequence. The document viewer application may remove extraneous content such as titles, chapter names or numbers, and watermarks, from candidate run objects before attempting to find a pattern. Once the page numbers are identified, the document viewer application may display the extracted page number with the corresponding page including the page number. The document viewer application may also generate a page label tree based on the extracted page numbers such that the page labels match the page number on the page.

Figure 1:
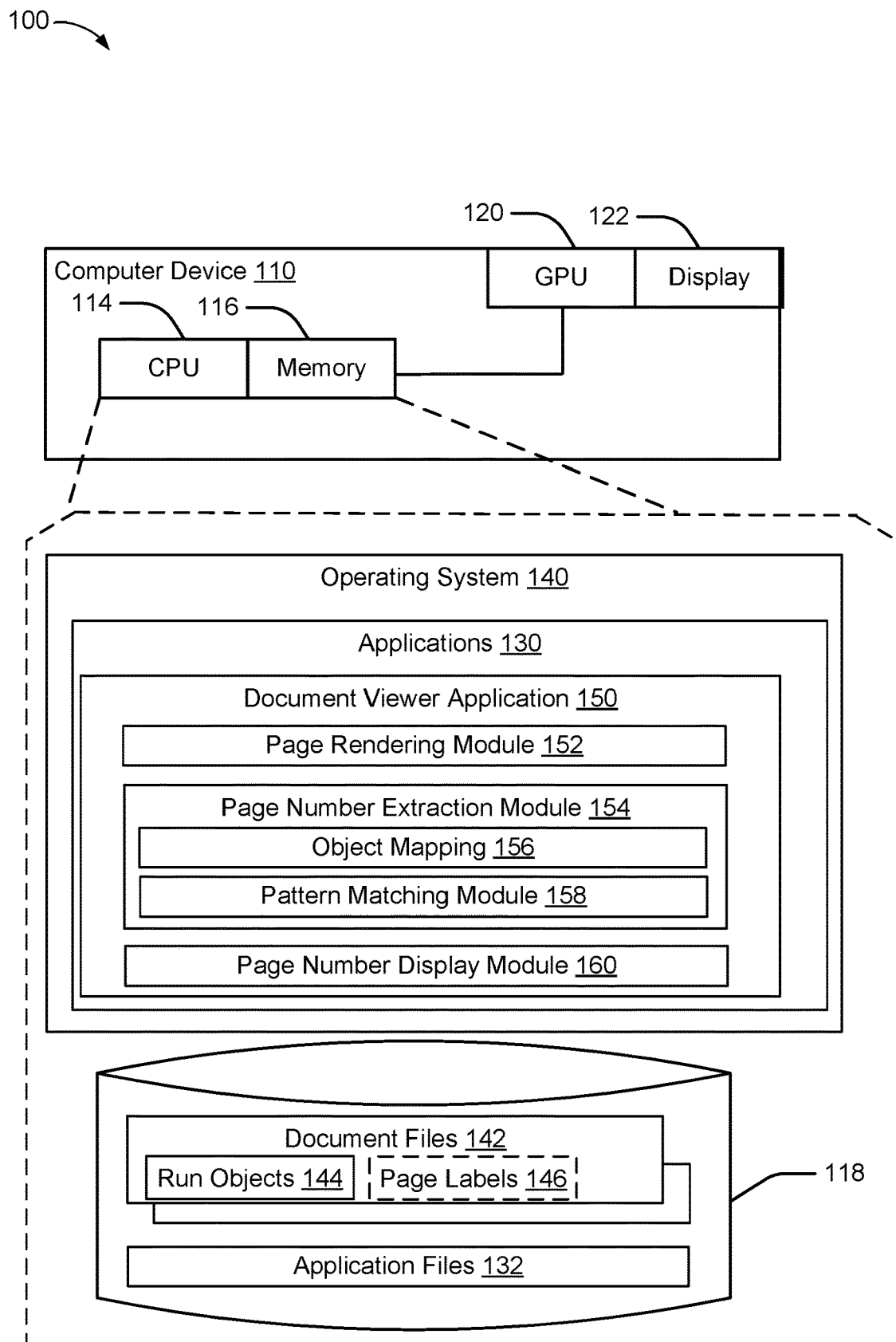
FIG. 1 is a diagram of an example computer system for displaying page numbers of a digital document, in accordance with an implementation of the present disclosure.

Referring now to FIG. 1, an example computer system 100 includes a computer device 110. The computer device 110 may be, for example, any mobile or fixed computer device including but not limited to a desktop or laptop or tablet computer, a cellular telephone, a gaming device, a mixed reality or virtual reality device, a music device, a television, a navigation system, a camera, a personal digital assistant (PDA), a handheld device, any other computer device having wired and/or wireless connection capability with one or more other devices, or any other type of computerized device capable of processing files and displaying digital documents.

The computer device 110 may include a central processing unit (CPU) 114 that executes instructions stored in memory 116. For example, the CPU 114 may execute an operating system 140 and one or more applications 130, which may include the document viewer application 150. The computer device 110 may also include a graphics processing unit (GPU) 120 for rendering an image for display on a display 122. For example, the display may present a user interface (UI) of the operating system 140 and/or the one or more applications 130.

The computer device 110 may include a display 122. The display 122 may be, for example, a computer monitor or a touch-screen. The display 122 may have a maximum display size. In an implementation, the display 122 may be subdivided into smaller portions. For example, a window may be a movable and resizable display area within the display 122. A window may have an adjustable display size.

Memory 116 may be configured for storing data and/or computer-executable instructions defining and/or associated with an operating system 140 and/or application 130, and CPU 114 may execute operating system 140 and/or application 130. Memory 116 may represent one or more hardware memory devices accessible to computer device 110. An example of memory 116 can include, but is not limited to, a type of memory usable by a computer, such as random access memory (RAM), read only memory (ROM), tapes, magnetic discs, optical discs, volatile memory, non-volatile memory, and any combination thereof. Memory 116 may store local versions of applications being executed by CPU 114. In an implementation, the memory 116 may include a storage device 118, which may be a non-volatile memory. The storage device 118 may store application files 132 corresponding to applications 130 and document files 142, which may include PDF files or other digital document files.

The CPU 114 may include one or more processors for executing instructions. An example of CPU 114 can include, but is not limited to, any processor specially programmed as described herein, including a controller, microcontroller, application specific integrated circuit (ASIC), field programmable gate array (FPGA), system on chip (SoC), or other programmable logic or state machine. The CPU 114 may include other processing components such as an arithmetic logic unit (ALU), registers, and a control unit. The CPU 114 may include multiple cores and may be able to process different sets of instructions and/or data concurrently using the multiple cores to execute multiple threads.

The operating system 140 may include instructions (such as applications 130) stored in memory 116 and executable by the CPU 114. The operating system 140 may include a document viewer application 150 for extracting page numbers from document files 142 and displaying pages of digital documents with corresponding extracted page numbers. In an implementation, the document viewer application 150 is a component of the operating system 140 that may be utilized whenever a command to view or open a digital document is received. In another implementation, the document viewer application 150 may be associated with one or more digital document file types and may be executed when a command is received to open a digital document of the associated file type.

The document viewer application 150 may include a page rendering module 152. The page rendering module 152 may include computer executable instructions for displaying content pages of a digital document according to a defined format of the digital document (e.g., portable document format). The page rendering module 152 may, for example, include instructions for rendering various object types on pages. For example, the page rendering module 152 may read run objects from a document file 142 and render content of the run object at a location indicated by the run object.

The document viewer application 150 may include a page number extraction module 154. The page number extraction module 154 may include computer executable instructions for determining page numbers of pages in a digital document based on content of the pages, particularly based on run objects of the pages. That is, the page number extraction module 154 may determine a page number for a page based on the content (e.g., a visible page number) of the page rather than an order of the page or a page label associated with the page. The page number extraction module 154 may include an object mapping 156 and a pattern matching module 158.

Figure 3:
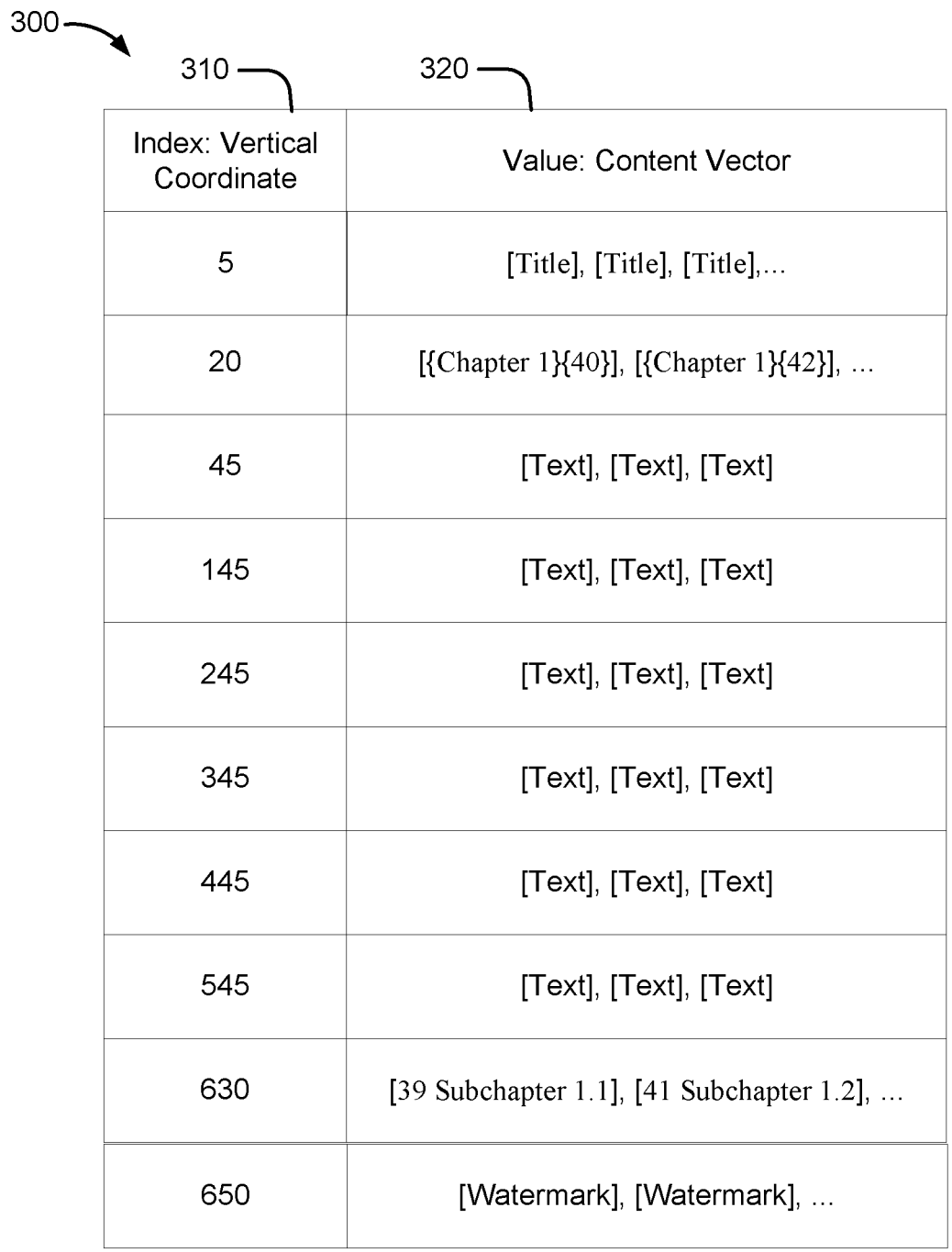
FIG. 3 is a conceptual diagram of an example data structure for mapping of run objects, in accordance with an implementation of the present disclosure.

The object mapping 156 may include a data structure and associated computer executable instructions for mapping content of pages of a digital document. In an example, the object mapping 156 may map vertical coordinates of run objects to content of the run objects found on different pages. An example of a data structure that may be used with the object mapping 156 is shown in FIG. 3.

The pattern matching module 158 may include computer executable instructions for detecting patterns among multiple pieces of content. For example, the pattern matching module 158 may detect a pattern of page numbers among a group of run object contents in the object mapping 156. The pattern matching module 158 may look for known patterns. For example, page numbers may follow an Arabic numeral pattern, an upper or lower case contiguous alpha pattern (e.g., A, B, C, Z, AA, BB, . . . ), or an upper or lower case Roman numeral pattern. Additionally, any of the page number patterns may be prefixed by a constant string. The pattern matching module 158 may execute algorithms or regular expressions for determining whether content matches a known pattern. For example, a contiguous alpha pattern may be detected in content by dividing the content by the number of letters, 26, to find a corresponding numerical page number and checking if the corresponding numerical page numbers of consecutive pages increase in linear order. As another example, the pattern matching module 158 may convert Roman numerals to corresponding numerical page numbers using the regular expression "^(?=[MDCLXVI])M*(C[MD]|D?C {0,3})(X[CL]|L?X{0,3}) (I[XV]|V?I{0,3})$." Constant prefixes may be filtered out by putting the potential strings into a prefix trie to determine a common prefix. The pattern matching module 158 may then determine whether the corresponding numerical page numbers of consecutive pages increase in linear order.

The page number display module 160 may include computer executable instructions for displaying one or more page numbers associated with a rendered page of a digital document. As discussed above, the page rendering module 152 may render the pages of the digital document. The document viewer application 150 may select a currently displayed page. The currently displayed page may be associated with one or more page numbers. First, under the PDF standard, each page is associated with a sequential number. Second, under the PDF standard, each page may optionally be associated with a page label defined by a label tree. Third, according to the present disclosure, a page may be associated with an extracted page number that is extracted from contents of the page. The page number display module 160 may generate a user interface including any combination of the page numbers associated with a current page.

The document files 142 may be computer files stored on a computer-readable medium. Each document file 142 may represent a digital document defined according to a document format such as PDF. PDF has no concept of lines of text or even a concept of word. That is, the document file 142 does not explicitly define lines or words that can be analyzed to determine a page number. Instead, with respect to text, PDF has the concept of a run object 144. A run object 144 is simply one or more characters, which is specified as a TJ/Tj command in the PDF content stream. The run object 144 may be adorned by coordinates in the page where the characters should be displayed (Tm command), as well as the font-family, size, etc. (Tf command) that should apply to that run object 144. In an implementation, a text object may include the font information, coordinates, and the run object. As mentioned above, a document file 142 may also include page labels 146. The page labels 146, however, are defined by a separate label tree, which may not be included in the document file 142 or may not correspond to page numbers in the content of the pages.

With respect to extracting page numbers, PDF creates a difficulty that run objects 144 blur the concepts of words and line. For example, one word may span multiple runs, or sometimes one run spans several words, etc. Similarly, a page number may be included in a single run object, or may be split between several run objects. Further, there is no guarantee of uniformity between pages, so a rule that works for identifying a page number on one page may not work on another page in the same document. For example, a page number on one page may be represented by a single run object 144 in the PDF file, whereas a page number on the subsequent page in the same position may be represented by multiple run objects at nearby locations.

Figure 2:
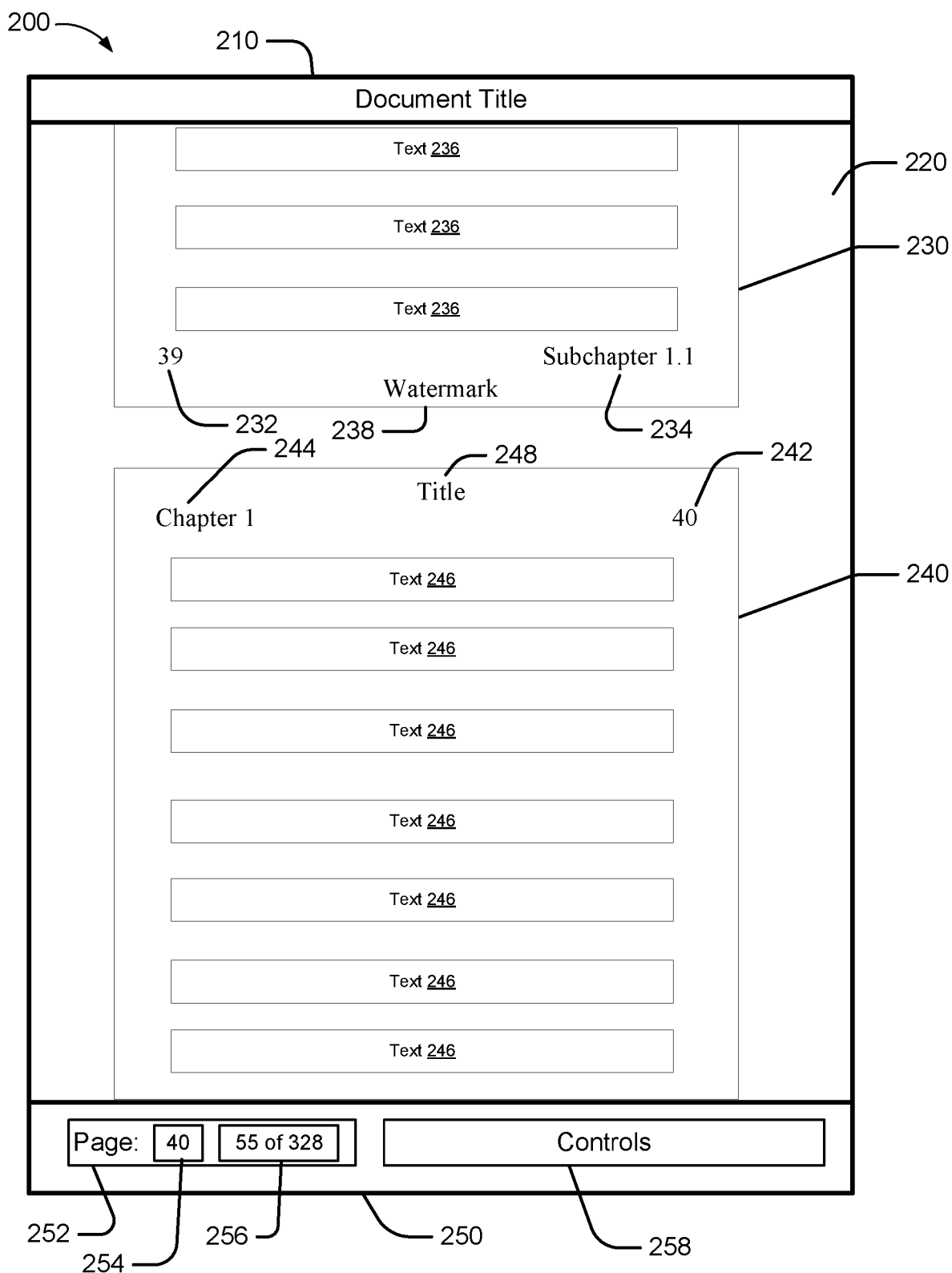
FIG. 2 is conceptual diagram illustrating an example user interface of a document viewer application, in accordance with an implementation of the present disclosure.

FIG. 2 illustrates an example user interface 200 for the document viewer application 150 displaying an example document file 142. For example, the CPU 114 and/or GPU 120 may render the user interface 200 on the display 122. The user interface 200 may include a document title section 210 that displays a document title or name of the document file 142, a page display area 220 that displays one or more pages of the document file 142, and a control area 250 that includes a page number display 252 and other controls. The document viewer application 150 and user interface 200 may also include additional features of conventional document viewer applications.

The document viewer application 150 may render one or more pages of the document file 142 in the page display area 220. For example, as illustrated, the page display area 220 includes a first page 230 and a second page 240. A bottom portion of the first page 230 and a top portion of the second page 240 are displayed. A user may scroll vertically to display different pages or portions thereof. As illustrated, the first page 230 includes a page number 232, a subchapter label 234, multiple lines of text 236, and a watermark 238, each of which may be represented in the document file 142 as one or more run objects 144. Similarly, the second page 240 includes a page number 242, a chapter label 244, multiple lines of text 246, and a title 248, each of which may be represented in the document file 142 as one or more run objects 144.

The example pages illustrate a page numbering system that may be especially difficult to detect. The page number 232 of the first page 230 is located in a bottom left corner, and the page number 242 of the second page 240 is located in a top right corner, so the page numbers are not always in the same location on the page. Additionally, the subchapter label 234 is located at approximately the same vertical position as the page number 232 and includes a number, so the subchapter label 234 may be mistaken as a page number. Similarly, the chapter label 244 is located at approximately the same vertical position as the page number 242 and includes a number, so the chapter label 244 may be mistaken as a page number. Other arrangements of page numbers and other information may be found in header and footer areas of various digital documents that may be displayed by the document viewer application 150. As noted above, the run object 144 does not distinguish pieces of text based on context or role. Additionally, in some cases, a page number may be entirely missing from the content of one or more pages.

The page number display 252 may be a portion of the user interface 200 that indicates one or more page numbers associated with a currently displayed page. In the illustrated example, the second page 240 may be considered the currently displayed page since the second page 240 fills a majority of the page display area 220. The page number display 252 may include an extracted page number 254 and a sequential page number 256. For example, the extracted page number 254 may simply be the extracted page number determined by the document viewer application 150. The sequential page number 246 may be simply the sequential page number or the sequential page number followed by the total number of pages, as illustrated. A page label 146 specified by a document author may also be included in the page number display 252, but is omitted to avoid confusion with the extracted page number 254. In an implementation, the types of page numbers may have an order of priority. For example, the extracted page number may be the highest priority, the page label 146 specified by the author may be a middle priority, and the sequential page number may be a default priority. The controls 258 may include user interface controls (e.g., buttons, switches, sliders, toggles, menus) for controlling display of the digital document.

Turning to FIG. 3, a mapping table 300 is an example data structure that may be used for extracting page numbers from a digital document. As discussed above, the run objects 144 may be generally unstructured within a document file 142. The mapping table 300 may structure the content of the run objects based on a vertical position of each run object 144. The mapping table 300 may include an index 310 and content vectors 320. The index 310 may be based on a vertical coordinate of the designated origin of each run object 144. In an implementation, a threshold may be used to group together run objects having similar vertical coordinates. For example, a threshold of 1 may indicate that text objects originating within 1 unit of the vertical coordinate of an existing entry in mapping table 300 should be grouped into the same entry. The content vectors 320 may include any structure for representing one or more vectors of content of run objects 144. For example, the content vectors 320 may be arrays or lists.

The mapping table 300 may be populated by analyzing the run objects 144 in a document file 142. The vertical coordinate of each run object may be compared to the index 310 to determine if an entry already exists. If no existing entry is within the threshold of the vertical coordinate, a new entry may be added. If the vertical coordinate matches an existing entry, the content of the run object may be added to the content vector 320 corresponding to the matching index 310. In an implementation, the page numbers are most likely to be located near the top or bottom of the page. Accordingly, the mapping table 300 may be limited based on a threshold distance from the top or bottom. The threshold distance may be defined as an absolute distance, or an ordinal index. For example, only the top 3 vertical coordinates and the bottom 3 vertical coordinates may meet an ordinal threshold for page numbers.

The content of the illustrated mapping table 300 may be an example for a document including the first page 230 and the second page 240. For example, a first entry at index 310 with a value of 5 may include the title 248 as the elements of the content vector 320 for multiple pages. A second entry at index 310 with a value of 20 may include elements "Chapter 1 40" and "Chapter 1 42" which include page numbers. Entries at index 310 with the values of 45, 145, 245, 345, 445, 545, may represent evenly spaced lines of text 246 that may vary from page to page. An entry at index 310 with a value of 630 may include elements "39 Subchapter 1.1" and "41 Subchapter 1.2" which include page numbers. An entry at index 310 with a value of 650 may include the watermark 238 as the elements of the content vector 320 for multiple pages.

Figure 4:
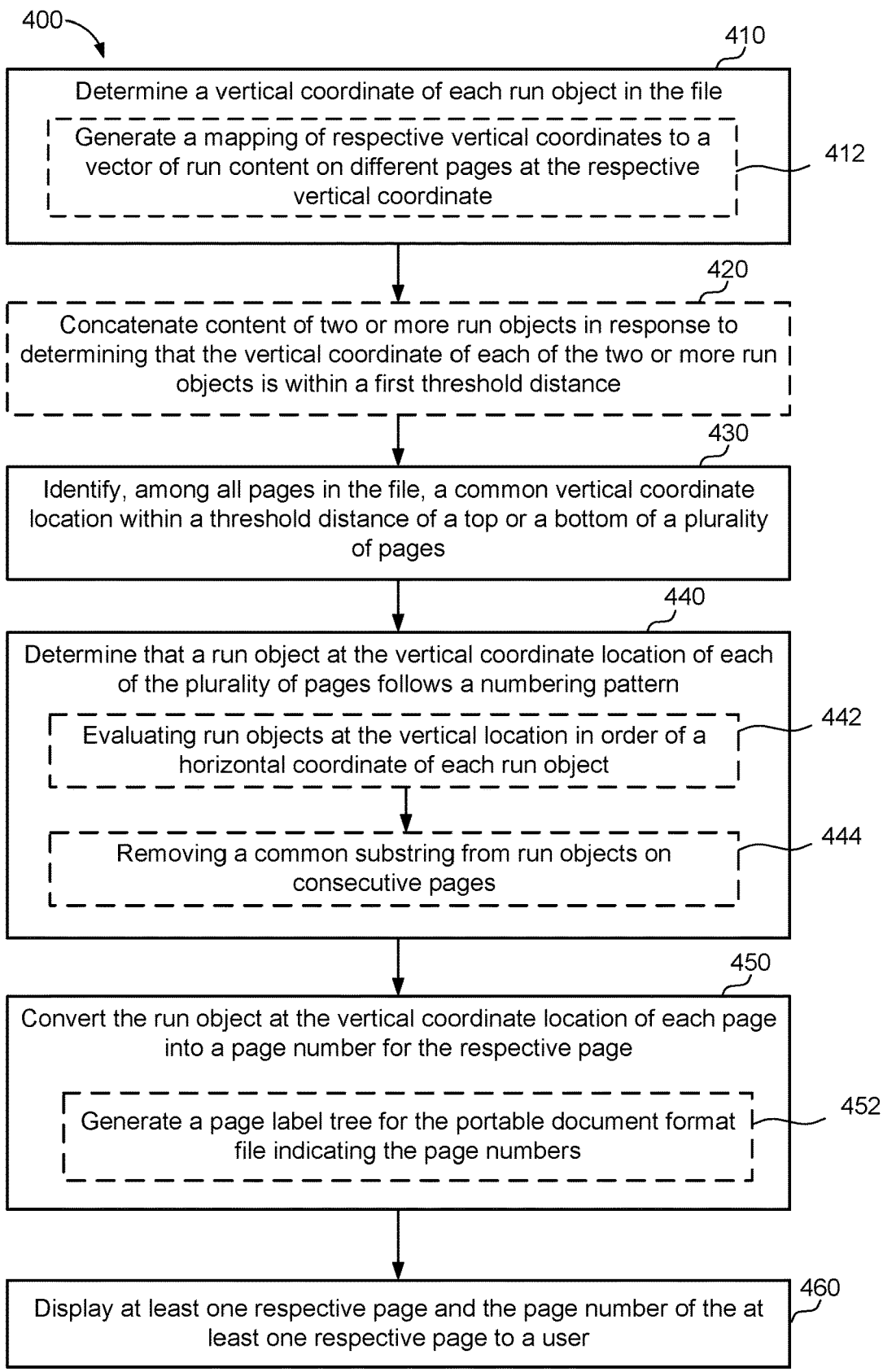
FIG. 4 is a flowchart of an example method of for displaying page numbers of a digital document, in accordance with an implementation of the present disclosure.

Turning to FIG. 4, an example method 400 extracts page numbers from page content of a digital document for display. For example, method 400 may be performed by the document viewer application 150 on the computer device 110.

At block 410, the method 400 may include determining a vertical coordinate of each run object in the file. For instance, in an implementation, the page number extraction module 154 may determine the vertical coordinate of each run object in the file. At block 412, the block 410 may optionally include generating a mapping of respective vertical coordinates to a vector of run content on different pages at the respective vertical coordinate. For example, the page number extraction module 154 may generate the object mapping 156 using the mapping table 300. The page number extraction module 154 may determine the index 310 according to the determined vertical coordinate and store the content in the corresponding content vector 320.

At block 420, the method 400 may optionally include concatenating content of two or more run objects in response to determining that the vertical coordinate of each of the two or more run objects is within a first threshold distance. For instance, the page number extraction module 154 may concatenate content of two or more run objects in response to determining that the vertical coordinate of each of the two or more run objects is within a first threshold. For example, the page number extraction module 154 may concatenate the content of two run objects on the same page having the same index 310 in mapping table 300. In an implementation, the page number extraction module 154 may also consider whether the horizontal coordinates are within a second threshold distance, which may be greater than the first threshold distance. For example, the second threshold distance may be the width of one or two characters. Concatenating the content of closely located run objects may consolidate page numbers that are divided into multiple run objects while still leaving page numbers separated from other characters as separate run objects.

At block 430, the method 400 may include identifying, among all pages in the file, a common vertical coordinate location within a threshold distance of a top or a bottom of a plurality of pages. For example, the page number extraction module 154 may identify among all pages in the document file 142, a common vertical coordinate location within a threshold distance of a top or a bottom of a plurality of pages. The page number extraction module may identify the common vertical coordinate by selecting an index 310 of mapping table 300 having content in the content vector 320 for a plurality of pages. The number of entries in the content vector 320 may be substantially the same (e.g., within 10%) of the number of pages (e.g., one page number in the same location on every page allowing for some missing page numbers). In some cases, the number of entries in the content vector 320 may be approximately half (e.g., within 10%) of the number of page (e.g., page numbers alternating between the top and bottom of the page. Use of the threshold distance of a top or a bottom of each page may eliminate run objects located near the middle of the page that are likely to be lines of text rather than page numbers even if the text starts at the same vertical coordinate on each page. In an implementation, the mapping table 300 may include only run objects having a vertical coordinate within the threshold distance of the top or bottom of the page. For instance, executing block 430 for the example mapping table 300 with an ordinal threshold of 2 may eliminate the vertical coordinates corresponding to the lines of text leaving indices with values of 5, 20, 630, and 650 as potential vertical locations of page numbers.

At block 440, the method 400 may include determining that a run object at the vertical coordinate location of each of the plurality of pages follows a numbering pattern. For example, the pattern matching module 158 may determine that the run object at the vertical coordinate location of each of the plurality of pages follows a numbering pattern. The pattern matching module 158 may compare each of the run objects in the content vector 320 corresponding to the vertical coordinate location to known page numbering patterns. Since page number patterns may change within a digital document, the pattern matching module 158 may determine sets of sequential pages following a page numbering pattern. At block 442, the block 440 may optionally include evaluating run objects at the vertical location in order of a horizontal coordinate of each run object. For example, the pattern matching module 158 may evaluate each run object in order of its respective horizontal coordinate. In another implementation, the block 440 may optionally include evaluating the run objects at the vertical location in order of run length. For example, the pattern matching module 158 may compare each of the run objects in order of run length. Generally, once run objects are concatenated based on close horizontal distance to approximate words, the page numbers are likely to be the shortest run objects on a line compared to, for example, chapter titles. For instance, in the index 310 with a value of 20, the chapter title may be concatenated together and the page number may be a separate run. Accordingly, the page numbers may have the shortest run lengths making the page numbers easy to identify as an increasing pattern of Arabic numerals.

In some cases, the page numbers may be grouped into a run object with other text (e.g., a chapter title or watermark). In block 444, the block 440 may optionally include removing a common substring from run objects on consecutive pages prior to determining whether the run object follows a numbering pattern. For example, the pattern matching module 158 may attempt to remove a common substring from each run object in the content vector 320. The common substring may have a minimum length. For example, a common substring of approximately 90% of the run object is likely a watermark, title, or other common element added to the page number line. The pattern matching module 158 may attempt to remove several types of substrings. A constant prefix may be a sequence of characters that precedes every page number. The pattern matching module 158 may identify a longest common prefix on two sequential pages, then determine whether the run objects match a numbering pattern when the longest common prefix is removed. A watermark may also be added before or after page numbers, for example, when the page numbers alternate between left and right corners. The pattern matching module 158 may use dynamic programming to find the longest common substring at the selected vertical coordinate on two or more sequential pages. The pattern matching module 158 may determine whether the run objects match a numbering pattern when the longest common substring is removed.

In some cases, for example, as illustrated in FIG. 4, the non-page number content of the selected vertical coordinate may vary between pages such that there is no common substring on sequential pages. The varying content typically occurs in the case of chapter or subchapter headings. The pattern matching module 158 may remove chapter and subchapter headings from the run object based on a table of contents of the document file 142. The table of contents may be specified within the document file 142 according to the PDF format. In other cases, a table of contents may be identified from run objects of the document file 142 using machine learning. One example of a suitable technique using machine-learning is described in Parikh et al., "Table of Content Detection Using Machine Learning," International Journal of Artificial Intelligence and Applications (IJAIA), Vol. 4, No. 3, May 2013, which is incorporated herein by reference. The sub-chapter, chapter, and document titles may be extracted from the table of contents based on the sequential page number. The pattern matching module 158 may use longest common substring matching between the extracted titles and the run objects to remove the titles.

For instance, in the example mapping table 300, the index 310 with a value of 20 may have a common prefix of "Chapter 1" (assuming each page is a single run object). The pattern matching module 158 may compare the content of two run objects to determine that "Chapter 1" is a common prefix to be removed. The index 310 with the value of 630, is more difficult because the non-page number portion is after the page number and varies. Dynamic programming may be able to identify the string "Subchapter" or "Subchapter 1." as a common sub string, but may not remove the entire subchapter number. Accordingly, in this case, the table of contents may be used to remove the subchapter numbers. A similar approach may be used if varying subchapter titles are used instead of subchapter numbers.

At block 450, the method 400 may include converting the run object at the vertical coordinate location of each page into a page number for the respective page. For example, the page number extraction module 154 may convert the run object at the vertical coordinate location of each page into the extracted page number 254 for the respective page. The page number extraction module 154 may store the portion of the run object matching the numbering pattern as the extracted page number 254 in association with the corresponding sequential page number to create a mapping between the two page numbers. At block 452, in an implementation, the block 450 may include generating a page label tree for the portable document format file indicating the page numbers. For example, the page number extraction module 154 may generate the page label tree according to the PDF format using the extracted page numbers 254.

In an implementation, converting the run objects to page numbers in block 450 may also include generating page numbers for pages that are missing a run object that matches the identified numbering pattern. The pattern matching module 158 may determine that at least one unnumbered page does not include a run object at the vertical coordinate location. The pattern matching module 158 may determine the numbering pattern of an adjacent page to the unnumbered page. The pattern matching module 158 may determine a page number for the unnumbered page based on a sequential order of the unnumbered page and the page number of the adjacent page.

At block 460, the method 400 may include displaying at least one respective page and the page number of the at least one respective page to a user. For example, the document viewer application 150 may display at least one respective page 240 and the page number 254 of the at least one respective page on the user interface 200 in the page display area 220 and the page number display 252.

Figure 5:
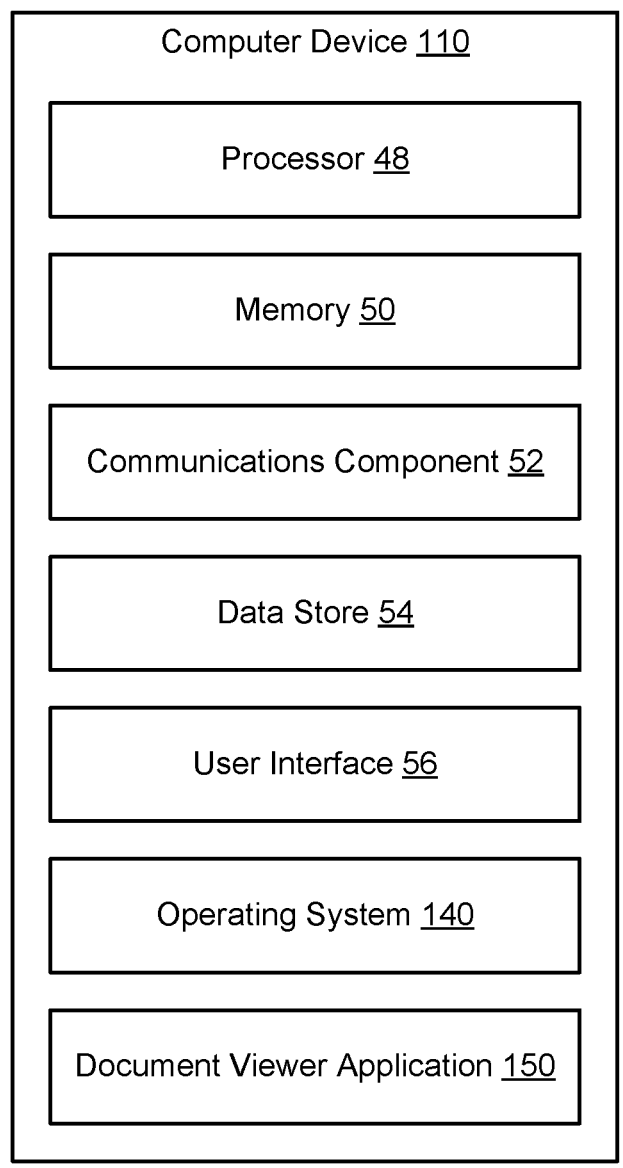
FIG. 5 is a schematic block diagram of an example computer device, in accordance with an implementation of the present disclosure.

Referring now to FIG. 5, illustrated is an example computer device 110 in accordance with an implementation, including additional component details as compared to FIG. 1. In one example, computer device 110 may include processor 48 for carrying out processing functions associated with one or more of components and functions described herein. Processor 48 can include a single or multiple set of processors or multi-core processors. Moreover, processor 48 can be implemented as an integrated processing system and/or a distributed processing system. In an implementation, for example, processor 48 may include CPU 114.

In an example, computer device 110 may include memory 50 for storing instructions executable by the processor 48 for carrying out the functions described herein. In an implementation, for example, memory 50 may include memory 116.

Further, computer device 110 may include a communications component 52 that provides for establishing and maintaining communications with one or more parties utilizing hardware, software, and services as described herein. Communications component 52 may carry communications between components on computer device 110, as well as between computer device 110 and external devices, such as devices located across a communications network and/or devices serially or locally connected to computer device 110. For example, communications component 52 may include one or more buses, and may further include transmit chain components and receive chain components associated with a transmitter and receiver, respectively, operable for interfacing with external devices.

Additionally, computer device 110 may include a data store 54, which can be any suitable combination of hardware and/or software, that provides for mass storage of information, databases, and programs employed in connection with implementations described herein. For example, data store 54 may be a data repository for operating system 140 and/or applications 130. The data store may include memory 116 and/or storage device 118.

Computer device 110 may also include a user interface component 56 operable to receive inputs from a user of computer device 110 and further operable to generate outputs for presentation to the user. User interface component 56 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, user interface component 56 may include one or more output devices, including but not limited to a display, a speaker, a haptic feedback mechanism, a printer, any other mechanism capable of presenting an output to a user, or any combination thereof.

In an implementation, user interface component 56 may transmit and/or receive messages corresponding to the operation of operating system 140 and/or application 130. In addition, processor 48 may execute operating system 140 and/or application 130, and memory 50 or data store 54 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or procedure described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or procedure may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A method, executed by a computer processor, of automatically extracting page numbers from a plurality, of pages in a portable document format (PDF) file, comprising:
   determining a vertical coordinate of each run object in the plurality of pages in the PDF file;
   identifying, among all of the plurality of pages in the PDF file, a common vertical coordinate location of the determined vertical coordinates of the run objects within a threshold distance of a top or a bottom of the plurality of pages;
   determining that a run object at the common vertical coordinate location of each page of the plurality of pages follows a numbering pattern, including removing a longest common substring from the determined run objects on consecutive pages before determining whether a remaining portion of each of the determined run objects follows the numbering pattern;
   converting the determined run object at the common vertical coordinate location of each page into a page number for the respective page; and
   displaying at least one respective page and the page number of the at least one respective page to a user.

2. The method of claim 1, further comprising:
   concatenating content of two or more of the run objects in response to determining that the vertical coordinate of each of the two or more run objects is within a first threshold distance and a horizontal coordinate of each of the two or more run objects is within a second threshold distance greater than the first threshold distance.

3. The method of claim 1, wherein determining the vertical coordinate of each run object in the plurality of pages in the PDF file comprises generating a mapping of respective vertical coordinates to a vector of run content at the respective vertical coordinate on different pages.

4. The method of claim 1, wherein the threshold distance of the top or the bottom of the plurality of the pages is an ordinal threshold of a number of vertical coordinates of run objects.

5. The method of claim 1, wherein determining that a run object at the common vertical coordinate location of each of the plurality of pages follows a numbering pattern comprises evaluating run objects at the common vertical location in order of a horizontal coordinate of each run object.

6. The method of claim 1, wherein determining that a nm object at the common vertical coordinate location of each page of the plurality of pages follows a numbering pattern comprises:
   locating a table of contents entry corresponding to a page of the plurality of pages; and
   removing a portion of run object content matching the table of contents entry before determining whether a remaining, portion of the run object follows the numbering pattern.

7. The method of claim 1, wherein converting the determined run object at the common vertical coordinate location of each page into a page number for the respective page comprises generating al page label tree for the portable document format file indicating the page numbers.

8. The method of claim 1, further comprising:
   determining that at, least one unnumbered page does not include a run object at the common vertical coordinate location;
   determining the numbering pattern of an adjacent page to the at least one unnumbered page; and
   determining a page number for the at least one unnumbered page based on a sequential order of the at least one unnumbered page and the page number of the adjacent page.

9. A computer device for automatically extracting page numbers from a plurality of pages in a portable document format (PDF) file, comprising:
   a memory; and
   a processor communicatively coupled to the memory, configured to:
      determine a vertical coordinate of each run object in the plurality of pages in the PDF file;
      identify, among all of the plurality of pages in the PDF file, a common vertical coordinate location of the determined vertical coordinates of the run objects within a threshold distance of a top or a bottom of the plurality of pages;
      locate a table of contents entry corresponding to a page in the plurality of pages;
      remove a portion of run object content matching the table of contents entry from a matching run object at the common vertical coordinate location of each page of the plurality of pages;
      determine, in response to the removal, that a remaining portion of the matching run object at the common vertical coordinate location of each page of the plurality of pages follows a numbering pattern;
      convert, in response to determining that the remaining portions follow the numbering pattern, the run object at the common vertical coordinate location of each page into a page number for the respective page; and display at least one respective, page and the page number of the at least one respective page to a user.

10. The computer device of claim 9, wherein the processor is configured to concatenate, content of two or more of the run objects in response to determining that the vertical coordinate of each of the two or more run objects is within a first threshold distance and a horizontal coordinate of each of the two or more run objects is within a second threshold distance greater than the first threshold distance.

11. The computer device of claim 9, wherein the processor is configured to generate a mapping of respective vertical coordinates to a vector of run content at the respective vertical coordinate on different pages.

12. The computer device of claim 9, wherein the threshold distance of the top or the bottom of the plurality of the pages is an ordinal threshold of a number of vertical coordinates of run objects.

13. The computer device, of claim 9, wherein the processor is configured to evaluate whether the run objects at the common vertical coordinate location follow the numbering pattern in order of a horizontal coordinate of each run object.

14. The computer device of claim 9, wherein the processor is configured to remove a longest common substring from run objects on consecutive pages before determining whether a remaining portion of each of the run objects follows the numbering pattern.

15. The computer device of claim 9, wherein the processor is configured to generate a page label tree for the portable document format file indicating the page numbers.

16. The computer device of claim 9, wherein the processor is configured to:
 determine that at least one page does not include a run object at the common vertical coordinate location;
 determine the numbering pattern of an adjacent page to the at least one page; and
 determine a page number for the at least one page based on a sequential order of the at least one page and the page number of the adjacent page.

17. A non-transitory computer-readable medium, comprising code executable by one or more processors for automatically extracting page numbers from a plurality of pages in a portable document format (PDF) file, the code comprising code for:
 determining a vertical coordinate of each run object in the plurality of pages in the PDF file;
 concatenating content of two or more of the run objects in response to determining that the vertical coordinate of each of the two or more run objects is within a first threshold distance;
 identifying, among all of the plurality of pages in the PDF file, a common vertical coordinate location of the determined vertical coordinates of the run objects within a threshold of a top or a bottom of a plurality of the pages;
 removing a common substring from the run objects at the common vertical coordinate on consecutive pages;
 determining, in response to the removal, that the run object at the common vertical, coordinate location of each page of the plurality of pages follows a numbering pattern;
 converting, in response to determining that the run objects at the common vertical coordinate location follow the numbering pattern the run object at the common vertical coordinate location of each page into a page number for the respective page; and
 displaying at least one respective page and the page number of the at least one respective page to a user.

18. The non-transitory computer-readable medium of claim 17, further comprising code for generating a mapping of respective vertical coordinates to a vector of run content at the respective vertical coordinate on different pages.

* * * * *